United States Patent [19]
Welstead, Jr. et al.

[11] 3,923,988
[45] Dec. 2, 1975

[54] 2-(2-PYRIDYL)-ω-PHENYLALKYLAMINES

[75] Inventors: William John Welstead, Jr.; Burt Trosey Merriman, Jr., both of Richmond, Va.

[73] Assignee: A. H. Robins Company, Incorporated, Richmond, Va.

[22] Filed: Mar. 15, 1974

[21] Appl. No.: 451,569

Related U.S. Application Data

[62] Division of Ser. No. 293,863, Oct. 2, 1972, Pat. No. 3,814,641.

[52] U.S. Cl. ......... 424/263; 424/248; 260/247.5 G; 260/296 R
[51] Int. Cl.² ......................................... A61K 31/44
[58] Field of Search..... 260/296 R, 296 H; 424/263, 424/248

[56] References Cited
UNITED STATES PATENTS
3,819,641  6/1974  Welstead et al. ............... 260/296 R OTHER PUBLICATIONS
Chemical Abstracts, Vol. 78, Abst. No. 4251r, (June 30, 1973), (abst. of Japanese Patent 72-25, 190).
Chemical Abstracts Subject Index, Vol. 78, p. 3508CS, (June 20, 1973).
Villani et al., J. Med. Chem., Vol. 13, pp. 359–366, (1970).

Primary Examiner—John D. Randolph

[57] ABSTRACT

Novel-2-(2-pyridyl)-ω-phenylalkylamines of the formula:

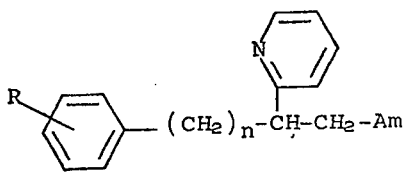

wherein Am is an amino radical selected from the group consisting of amino-(-NH$_2$), di-lower-alkylamino, pyrrolidino, piperidino and morpholino; R is selected from the group consisting of hydrogen, fluorine, chlorine, bromine, methoxy and trifluoromethyl; n is a positive integer from 1 to 2 inclusive are prepared by (a) reacting 2-(ω-phenylalkyl)pyridines with formaldehyde and secondary amines, and (b) lithium aluminum hydride reduction of α-benzyl-2-pyridylacetonitriles. The novel products are useful as antisecretory agents.

18 Claims, No Drawings

2-(2-PYRIDYL)-ω-PHENYLALKYLAMINES

This application is a division of copending application, Ser. No. 293,863, filed Oct. 2, 1972, now U.S. Pat. No. 3,819,641.

The present invention is concerned with novel phenylalkylamines and is more particularly concerned with 2-(2-pyridyl)-ω-phenylalkylamines, processes for the production thereof, and compositions employing the active compounds.

The novel compounds of the invention have the formula:

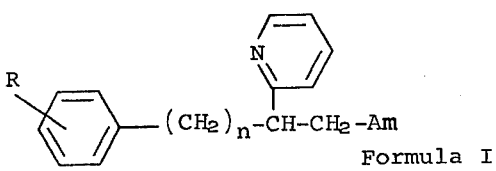

Formula I wherein;

Am is an amino radical selected from the group consisting of amino (-NH$_2$), di-lower-alkylamino, pyrrolidino, piperidino and morpholino, R is selected from the group consisting of hydrogen, chlorine, fluorine, bromine, methoxy and trifluoromethyl, n is a positive integer from 1 to 2 inclusive, and the pharmaceutically acceptable acid-addition salts thereof.

In the definition of symbols in the foregoing Formula I and where they appear elsewhere throughout this specification, the terms have the following significance.

The term "lower-alkyl" as used herein includes straight and branched chain radicals of up to six carbon atoms inclusive, preferably no more than four carbon atoms, and is exemplified by such groups as methyl, ethyl, propyl, isopropyl, butyl, sec. butyl, tertiary butyl, amyl, isoamyl, hexyl, and the like.

This invention also includes the pharmaceutically acceptable non-toxic acid addition salts of the bases of Formula I with organic and inorganic acids. Exemplary of such organic salts are those formed with maleic, fumaric, tartaric, succinic acid and the like. Exemplary of such inorganic salts are those formed with hydrochloric, hydrobromic, and phosphoric acids.

METHOD OF PREPARATION

The novel compounds of Formula I may be prepared by (a) mixing and reacting a 2-(ω-phenylalkyl)pyridine (II) with formaldehyde (III) and a secondary amine (IV) and (b) lithium aluminum hydride reduction of an α-benzyl-2-pyridylacetonitrile (V). The reaction sequences can be represented as follows:

wherein R, Am and n have the values assigned hereinabove.

GENERAL METHOD FOR THE PREPARATION OF 2-(2-PYRIDYL)-ω-PHENYLALKYLAMINES a. A lower alkanol-water solution containing a 2-(ω-phenylalkyl)pyridine, a secondary amine and paraformaldehyde is refluxed for an extended period of from about 40 hours to about 100 hours or until aliquot analyses of the reaction mixture by suitable means as, for example, gas chromatography, indicates a substantial yield of end product has formed. The product is isolated from the reaction mixture by a suitable procedure such as acid-base extraction, chromatography of the residual oil on a magnesium silicate column or conversion of the base to an acid-addition salt which is further purified by recrystallization from a suitable solvent.

b. A stirred dry ether mixture of lithium aluminum hydride and aluminum chloride is treated with a dry ether solution of a suitably substituted α-benzyl-2-pyridylacetonitrile. After stirring for a period of from about one hour to about five hours the reaction mixture is carefully decomposed by the addition of water, the layers separated and the product isolated from the organic layer by acid-base extraction. The product is converted to a suitable acid-addition salt which is further purified by recrystallization from a suitable solvent.

The compounds of the invention are useful because of their pharmacological action in depressing the volume of gastric secretions by the pyloric ligated (Shayrat) procedure. The activity is demonstrable when the compounds are used in the form of their free base or in the form of their non-toxic acid addition salts. The preferred form of the compounds is as their non-toxic acid addition salts for increased water solubility and ease of administration.

Useful compositions containing at least one of the compounds according to the invention in association with a pharmaceutical carrier or excipient may be prepared in accordance with conventional technology and procedures. Compositions for oral administration can be solid or liquid and can take the form of capsules, tablets and coated tablets, such compositions comprising carriers or excipients conveniently used in the pharmaceutical art. Suitable tableting excipients include lactose, potato and maize starches, talc, gelatin, and stearic and silicic acids, magnesium stearate, and polyvinyl pyrrolidone.

The compositions may be formulated as dosage units, each unit being adapted to supply a fixed dose of active ingredient. Tablets, capsules and coated tablets are examples of preferred dosage units according to the invention. Unit dosages can be 5 milligrams or above and preferably 25, 50 and 100 milligrams.

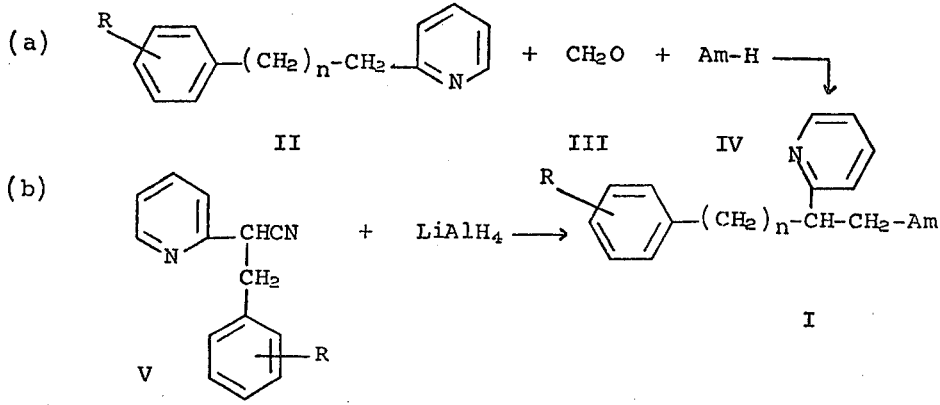

The compositions may be administered to mammals to suppress secretory activity and the dose administered will depend on the severity of the condition and in relation to the body weight of the mammal being treated.

It is, accordingly, an object of the present invention to provide novel compounds which are effective antisecretory agents. Another object is to provide certain novel and useful 2-(2-pyridyl)-ω-phenylalkylamines, compositions thereof, and methods of making and using the same. Other objects of the invention will be apparent to one skilled in the art, and still other objects will become apparent hereinafter.

The starting materials for the novel compounds of the present invention are the compounds of Formula II and Formula V given hereinabove. They are either commercially available or they can be prepared by the procedures given in the preparations described immediately hereinafter.

PREPARATION 1

α-(p-Chlorobenzylidene)-2-pyridylacetonitrile

A mixture of 2-pyridylacetonitrile (20.0 g.; 0.17 mole), 35.6 g. (0.254 mole) of p-chlorobenzaldehyde, 13.6 g. (0.034 mole) of 10 percent sodium hydroxide solution and 100 ml. of ethanol was heated at 50°C. for 1.0 hour. The α-(p-chlorobenzylidene)2-pyridylacetonitrile was obtained in 86 percent yield after it was collected from the cooled reaction mixture and crystallized from ethanol-water mixture.

Analysis: Calculated for $C_{14}H_9N_2Cl$: C,69.86; H,3.77; N,11.64 Found: C,69.84; H,3.81; N,11.69

When, in the above process, p-bromobenzaldehyde, p-fluorobenzaldehyde and m-trifluoromethylbenzaldehyde is used in place of p-chlorobenzaldehyde, there is obtained α-(p-bromobenzylidene)2-pyridylacetonitrile, α-(p-fluorobenzylidene)-2-pyridylacetonitrile and α-(m-trifluorobenzylidene)-2-pyridylacetonitrile.

PREPARATION 2

α-(p-Chlorobenzyl)-2-pyridylacetonitrile

A solution of 34.7 g. (0.145 mole) of α-(p-chlorobenzylidene)-2-pyridylacetonitrile in 150 ml. of methanol was treated with 10 percent palladium-on-charcoal and the mixture was shaken in three atmospheres of nitrogen at room temperature for two hours during which time a pressure drop of 10 p.s.i. occurred. The filtered solution was concentrated at reduced pressure to give 31.7 g. of residue which, on thin layer chromatography, showed the presence of two components. Chromatography of the residue on magnesium silicate gave 29.6 g. (70.5 percent) of α-(p-chlorobenzyl)-2-pyridylacetonitrile.

Analysis: Calculated for $C_{14}H_{11}N_2Cl$: C,69.28; H,4.57; N,11.54 Found: C,69.78; H,4.64; N,11.61

When, in the above process, α-(p-bromobenzylidene)-2-pyridylacetonitrile, α-(p-fluorobenzylidene)-2-pyridylacetonitrile and α-(m-trifluoromethylbenzylidene)-2-pyridylacetonitrile is used in place of α-(p-chlorobenzylidene)-2-pyridylacetonitrile, there is obtained α-(p-bromobenzyl)-2-pyridylacetonitrile, α-(p-fluorobenzyl)-2-pyridylacetonitrile and α-(m-trifluorobenzyl)2-pyridylacetonitrile.

PREPARATION 3

2-(p-Chlorophenethyl)pyridine

A stirred solution of 13.9 g. (0.15 mole) of 2-picoline in 90 ml. of tetrahydrofuran was treated with 105 ml. of butyllithium in hexane (15.14 percent assay; 0.168 mole) at -40°C. After 1.0 hr. aliquot analysis indicated 50 percent reaction. An additional 40 ml. (0.064 mole) of butyllithium in hexane was added and after a 1.0 hr. reaction period, 24.2 g. (0.15 mole) of p-chlorobenzylchloride was added at -45°C. The reaction mixture was kept below -35°C. for three hours and then allowed to rise to room temperature. After stirring overnight the reaction mixture was poured into water, the organic layer separated, washed with water, dried (magnesium sulfate) and evaporated at reduced pressure to give 39.3 g. of residue. Distillation of the residue at 0.10 mm. gave three fractions distilling at 115°–120°C., 120°–125°C. and 130°–135°C. The wt. of the three fractions was 26.3 g. (81.1 percent). The nuclear magnetic resonance spectrum of fractions 1 and 2 was consistent with the structure of 2-(p-chlorophenethyl)pyridine.

PREPARATION 4

2-Phenylpropylpyridine

A stirred solution of 27.9 g. of (0.30 mole) of 2-picoline in 200 ml. of tetrahydrofuran was treated with 212 ml. of butyllithium in hexane (15.4 percent assay; 0.33 mole) at -45°C. After 2.5 hours, aliquot analysis indicated 82 percent reaction. The mixture was treated with 55.5 g. (0.30 mole) of 2-phenylethyl chloride with the temperature kept below -35°C. After stirring overnight the reaction mixture was poured into water. The organic layer was separated, washed with water, dried (sodium sulfate) and evaporated under reduced pressure to give 57.5 grams of residue. The residue was distilled at 110°–120°C. (0.10 mm.) to give 44.5 grams (75.5 percent) of 2-phenpropylpyridine.

EXAMPLE 1

3-Phenyl-2-(2-pyridyl)-N,N-dimethylpropylamine Fumarate Hydrate

A mixture of 39 g. (0.48 mole) of dimethylamine hydrochloride, 14.8 g. (0.08 mole) of 2-(2-phenylethyl)-pyridine, 10.2 g. (0.34 mole) of paraformaldehyde, 25 ml. of water and 45 ml. of ethanol was refluxed for six hours. An additional 3.8 ml. of 38 percent hydrochloric acid was added and the reaction mixture was refluxed for an additional 54 hours. Analysis of an aliquot by gas chromatography showed approximately 50 percent product formation. An additional 39 g. of dimethylamine hydrochloride was added and refluxing was continued for 42 hours. Analysis of an aliquot by gas chromatography indicated 70–80 percent product formation. The reaction mixture was neutralized with 5N sodium hydroxide solution and the organic materials were extracted into chloroform. The chloroform extracts were washed with water, dried (magnesium sulfate) and concentrated under reduced pressure to an oil (14.6 g.). The oil was chromatographed on a column of magnesium silicate using benzene-acetone to elute. The 3-phenyl-2-(2-pyridyl)-N,N-dimethylpropylamine product eluted from the column weighed 8.3 g. The base was dissolved in hot isopropanol and converted to the fumarate salt which melted at 100°–102°C. Nuclear magnetic resonance analysis of the salt indicated 1.5 fumarate molecules for each molecule of base. The compound analyzed as the fumarate monohydrate.

Analysis: Calculated for $C_{22}H_{28}N_2O_7$: C,61.10; H,6.53; N,6.48 Found: C,61.90; H,6.31; N,6.33

EXAMPLE 2

3-(p-Chlorophenyl)-2-(2-pyridyl)-N,N-dimethylpropylamine Dimaleate

A stirred mixture of 25.1 g. (0.11 mole) of 2-[2-(p-chlorophenyl)ethyl]pyridine, 16.9 g. (0.56 mole) of paraformaldehyde, 75. g. (0.92 mole) of dimethylamine hydrochloride, 50 ml. of water and 145 ml. of 95 percent ethanol was refluxed for 44 hours. After 17 hours, 50 ml. of ethanol was distilled off. At the end of the 44 hours, gas chromatography of an aliquot showed 10–15 percent of the starting material remaining. The cooled reaction mixture was treated with 200 ml. of 1N hydrochloric acid and extracted with six 100 ml. portions of chloroform. The acidic solution was treated with 5N sodium hydroxide solution and the base insoluble product was extracted into chloroform. The combined chloroform extracts were washed with water, dried (magnesium sulfate) and concentrated under reduced pressure to an oil (28.5 g.). The oil (25.4 g.) in isopropanol was converted to the dimaleate salt. Recrystallization of the salt from ethyl acetate gave 23 g. (40 percent) of the dimaleate salt which melted at 86°–88°C.

Analysis: Calculated for $C_{24}H_{27}Cl_2N_2O_8$: C,56.86; H,5.37; N,5.53 Found: C,56.92; H,5.43; N,5.56

EXAMPLE 3

3-(p-Chlorophenyl)-2-(2-pyridyl)propylamine Fumarate

A stirred solution of 1.27 g. (0.03 mole) of lithium aluminum hydride in 75 ml. of dry ether was treated with a suspension of 4.4 g. (0.03 mole) of aluminum chloride in 75 ml. of dry ether. After five minutes the heterogeneous mixture was treated dropwise with a solution of 8.1 g. (0.03 mole) of α-(p-chlorobenzyl)-2-pyridylacetonitrile in 100 ml. of dry ether. The reaction mixture was stirred for one hour after the addition was complete. The excess lithium aluminum hydride was decomposed with water and the mixture was treated with 42 ml. of sulfuric acid and 33 ml. of water. The ether layer was separated and the aqueous acidic layer was extracted several times with ether. The acidic layer was made basic with potassium hydroxide solution to pH 11 and the basic product was extracted with ether. The combined ether extracts were dried (magnesium sulfate) and concentrated under reduced pressure to an oil (8.2 g.). The crude oil (7.5 g.) was converted to the fumarate salt in isopropanol. Recrystallization of the salt from isopropanol-water gave 8.5 g. (70 percent) of pure monofumarate salt which melted at 169°–173°C. The analytical sample (isopropanol-water) melted at 172°–174°C.

Analysis: Calculated for $C_{18}H_{19}ClN_2O_4$: C,59.59; H,5.28; N,7.72 Found: C,59.51; H,5.30; N,7.59

EXAMPLE 4

4-Phenyl-2-(2-pyridyl)-N,N-dimethylbutylamine Dihydrochloride.

A stirred mixture of 25 g. (0.13 mole) of 2-(3-phenylpropyl) pyridine, 19 g. (0.64 mole) of paraformaldehyde, 83 g. (1.02 moles) of dimethylamine hydrochloride, 50 ml. of water and 150 ml. of 95 percent ethanol was refluxed for 70 hours. Gas chromatography of an aliquot showed that approximately 70 percent had formed. Approximately 50 ml. of solvent was distilled off and the reaction mixture was refluxed an additional 2 hours. The cooled reaction mixture was acid-base extracted and the combined chloroform extracts of the basic product was dried (sodium sulfate) and concentrated under vacuum to give 20 g. of an oil. The oil was converted to the dihydrochloride salt which was recrystallized from isopropanol-isopropyl ether; yield 13 g. (31.4 percent); m.p. 183°–185°C.

Analysis: Calculated for $C_{17}H_{24}Cl_2H_2$: C,62.38; H,7.39; H,8.55 Found: C,62.14; H,7.41; N,8.61

EXAMPLE 5

3-Phenyl-2-(2-pyridyl)propylpyrrolidine

In the same manner as given in Example 1, 3-phenyl-2-(2-pyridyl)propylpyrrolidine is prepared from 2-(2-phenylethyl) pyridine, paraformaldehyde and pyrrolidine hydrochloride.

EXAMPLE 6

3-Phenyl-2-(2-pyridyl)propylpiperidine

In the same manner as given in Example 1, 3-phenyl-2-(2-pyridyl)propylpiperidine is prepared from 2-(2-phenylethyl) pyridine, paraformaldehyde and piperidine hydrochloride.

EXAMPLE 7

3-Phenyl-2-(2-pyridyl)propylmorpholine

In the same manner as given in Example 1, 3-phenyl-2-(2-pyridyl)propylmorpholine is prepared from 2-(2-phenylethyl) pyridine, paraformaldehyde and morpholine hydrochloride.

EXAMPLE 8

3-(p-Bromophenyl)-2-(2-pyridyl)propylamine

In the same manner as given in Example 3, 3-(p-bromophenyl)-2-(2-pyridyl)propylamine is prepared from α-(p-bromobenzyl)-2-pyridylacetonitrile and lithium aluminum hydride-aluminum chloride.

EXAMPLE 9

4-(o-Methoxyphenyl)-2-pyridyl-N,N-dimethylbutylamine

In the same manner as given in Example 4, 4-(o-methoxyphenyl)-2-pyridyl-N,N-dimethylbutylamine is prepared from 2-(2-methoxyphenylpropyl)pyridine, dimethylamine hydrochloride and paraformaldehyde.

EXAMPLE 10

3-(m-Trifluoromethylphenyl)-2-(2-pyridyl)propylamine

In the same manner as given in Example 3, 3-(m-trifluoromethylphenyl)-2-(2-pyridyl)propylamine is prepared from α-(m-trifluoromethylbenzyl)-2-pyridylacetonitrile and lithium-aluminum hydride-aluminum chloride.

EXAMPLE 11

3-(p-Fluorophenyl)-2-(2-pyridyl)propylamine

In the same manner as given in Example 3, 3-(p-fluorophenyl)-2-(2-pyridyl)propylamine is prepared from α-(p-fluorobenzyl)-2-pyridylacetonitrile and lithium-aluminum hydride-aluminum chloride.

What is claimed is:

1. A composition suitable for its gastric anti-secretory effect comprising (1) an effective amount of between 5.0 and 100 milligrams of a compound selected from those having the formula:

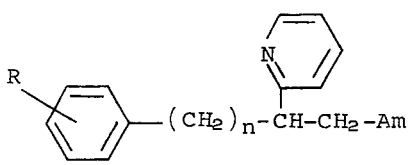

wherein;
Am is an amino radical selected from the group consisting of amino (-NH₂), di-lower-alkylamino, pyrrolidino, piperidino, and morpholino,
R is selected from the group consisting of hydrogen, fluorine, chlorine, bromine, methoxy and trifluoromethyl,
n is a positive integer from 1 to 2 inclusive, and the pharmaceutically acceptable acid addition salts thereof, and
2. a pharmaceutical carrier.

2. The composition of claim 1 wherein the compound is 3-(p-chlorophenyl)-2-(2-pyridyl)-N,N-dimethylpropylamine.

3. The composition of claim 1 wherein the compound is 3-(P-chlorophenyl)-2-(2-pyridyl)propylamine.

4. The composition of claim 1 wherein the compound is 4-phenyl-2-(2-pyridyl)-N,N-dimethylbutylamine.

5. The composition of claim 1 wherein the compound is 3-phenyl-2-(2-pyridyl)-N,N-dimethylpropylamine.

6. The method of reducing gastric secretory activity in a mammal which comprises administering an effective amount of a compound having the formula:

wherein;
Am is an amino radical selected from the group consisting of amino (-NH₂), di-lower-alkylamino, pyrrolidino, piperidino and morpholino,
R is selected from the group consisting of hydrogen, fluorine, chlorine, bromine, methoxy and trifluoromethyl,
n is a positive integer from 1 to 2 inclusive and the pharmaceutically acceptable acid addition salts thereof.

7. The method of claim 6 wherein the compound is 3-(p-chlorophenyl)-2-(2-pyridyl)-N,N-dimethylpropylamine.

8. The method of claim 6 wherein the compound is 3-(p-chlorophenyl)-2-(2-pyridyl)propylamine.

9. The method of claim 6 wherein the compound is 4-phenyl-2-(2-pyridyl)-N,N-dimethylbutylamine.

10. The method of claim 6 wherein the compound is 3-phenyl-2-(2-pyridyl)-N,N-dimethylpropylamine.

11. The composition of claim 1 wherein the compound is the dimaleate salt of 3-(p-chlorophenyl)-2-(2-pyridyl)-N,N-dimethylpropylamine.

12. The composition of claim 1 wherein the compound is the fumarate salt of 3-(p-chlorophenyl)-2-(2-pyridyl)propylamine.

13. The composition of claim 1 wherein the compound is the dihydrochloride salt of 4-phenyl-2-(2-pyridyl)-N,N-dimethylbutylamine.

14. The composition of claim 1 wherein the compound is the fumarate hydrate of 3-phenyl-2-(2-pyridyl)-N,N-dimethylpropylamine.

15. The method of claim 6 wherein the compound is the dimaleate salt of 3-(p-chlorophenyl)-2-(2-pyridyl)-N,N-dimethylpropylamine.

16. The method of claim 6 wherein the compound is the fumarate salt of 3-(p-chlorophenyl)-2-(2-pyridyl)-propylamine.

17. The method of claim 6 wherein the compound is the dihydrochloride salt of 4-phenyl-2-(2-pyridyl)-N,N-dimethylbutylamine.

18. The method of claim 6 wherein the compound is the fumarate hydrate of 3-phenyl-2-(2-pyridyl)-N,N-dimethylpropylamine.

* * * * *